Oct. 26, 1965 J. A. BERNARD 3,214,231
REMOVABLE STRUCTURE WITH MAGNETIC SEAL
Filed Sept. 25, 1963 2 Sheets-Sheet 2

INVENTOR.
James A. Bernard
BY
His Attorney

United States Patent Office 3,214,231
Patented Oct. 26, 1965

3,214,231
REMOVABLE STRUCTURE WITH MAGNETIC SEAL
James A. Bernard, Dayton, Ohio, assignor to General Motors Corporation, Detroit, Mich., a corporation of Delaware
Filed Sept. 25, 1963, Ser. No. 311,521
4 Claims. (Cl. 312—296)

This invention pertains to refrigerating apparatus and more particularly to an air sealing arrangement for sealing a resiliently mounted air conditioning unit within an enclosure and similar sealing applications.

One of the most desirable features of air conditioning apparatus is quietness. Quietness can best be accomplished by resiliently mounting the air conditioning unit or other similar structures within an enclosure. In air conditioning or air circulating units and other similar apparatus, to obtain the greatest effectiveness it is necessary to prevent leakage between the dividing wall of the air conditioning unit and the enclosure. However ordinary seals restrict the movement of resiliently mounted air conditioning apparatus or other resiliently mounted structures within the enclosure so that some of the vibrations are transmitted to the enclosure and all of the desired quietness is not attained. The removability of the unit from the enclosure makes the sealing problem more difficult. Particularly it is difficult to provide a seal which will provide adequate sealing and yet will not diminish the vibration absorbing properties of the resilient mounting.

It is an object of this invention to provide a seal for a removable structure within an enclosure which will not interfere with the limited or controlled movement of the structure as provided for by a resilient mounting.

It is another object of this invention to provide a seal for a removable structure within an enclosure which adheres magnetically to the structure or to the enclosure to provide a readily disengageable sealing fastening.

It is a more specific object of this invention to provide an improved seal for a removable structure within an enclosure which is in the form of a thin flexible membrane permanently fastened at one of its edges to the removable structure and which has its other edges adhering magnetically to the enclosure to provide a readily disengageable sealing connection with the enclosure.

These and other objects are attained in the form shown in the drawings in which a conventional refrigeration air conditioning unit is mounted upon the two pairs of springs—each pair being connected to a slide runner for resiliently and removably supporting the unit within a conventional cabinet. To make provision for the resilient mounting there must be suitable clearance space between the air conditioning unit and its enclosure so that the unit may vibrate freely without transmitting the vibrations thereof to the enclosure. To provide a seal for this clearance space to prevent the uncontrolled flow between the inside and outside air without diminishing the ability of the springs to absorb the vibrations of the unit, I provide a thin flexible membrane of substantially greater width than the width of the clearance space which has one of its edges permanently fastened to the unit and which has its opposite edge containing permanent magnetic material. Preferably this edge incorporates a permanent magnetic powder such as iron barium oxide, or barium ferrite, bismuth manganese, or strontium ferrite. These powders may be embedded in the edge of strip adapted to be held by its magnetic properties against the inside of the sheet steel enclosure.

Further objects and advantages of the present invention will be apparent from the following description, reference being had to the accompanying drawings wherein preferred embodiments of the present invention are clearly shown.

Figure 1:
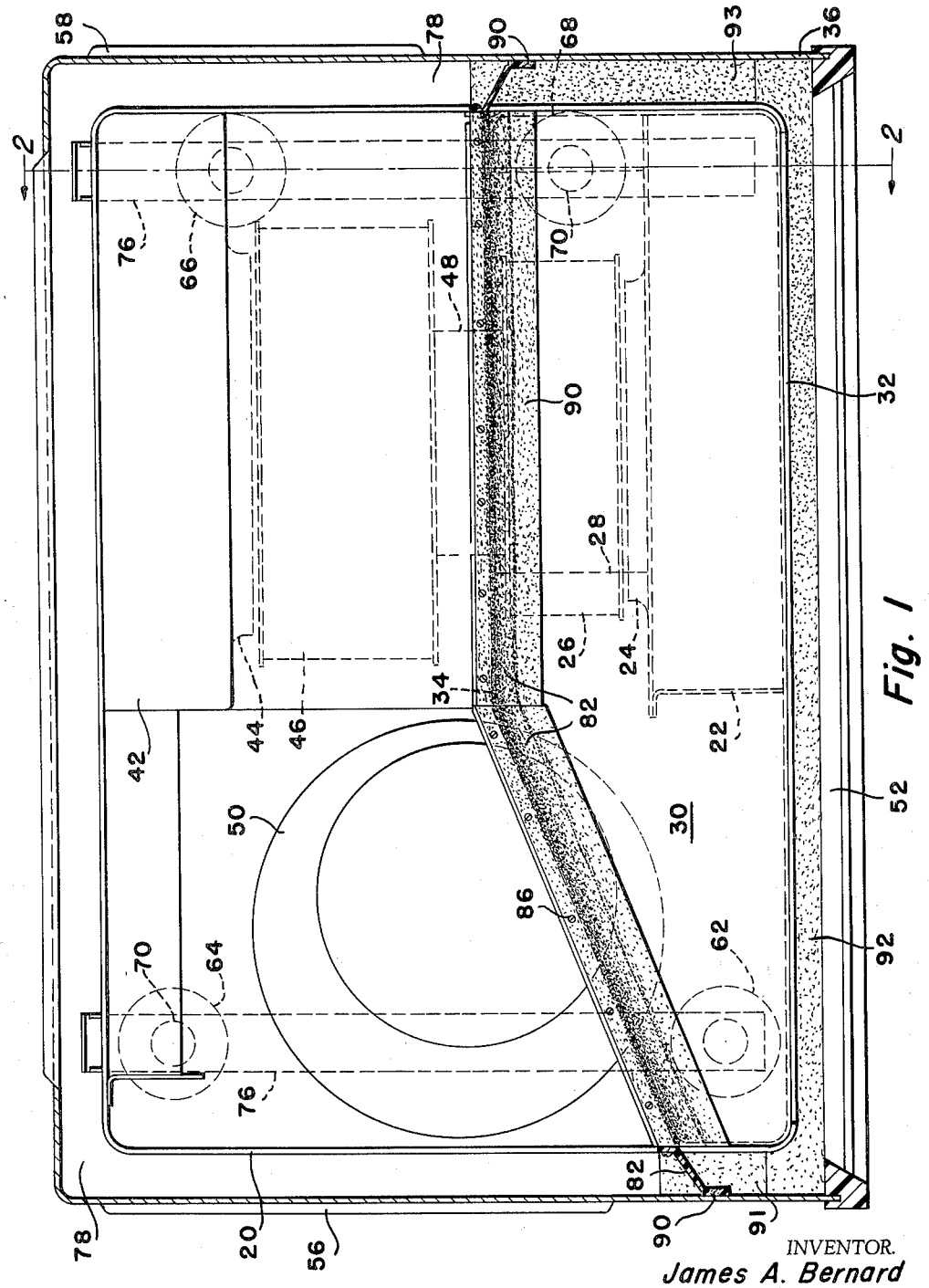
FIGURE 1 is a horizontal sectional view through an air conditioning unit embodying one form of my invention taken substantially along the line 1—1 of FIGURE 2.
Figure 2:
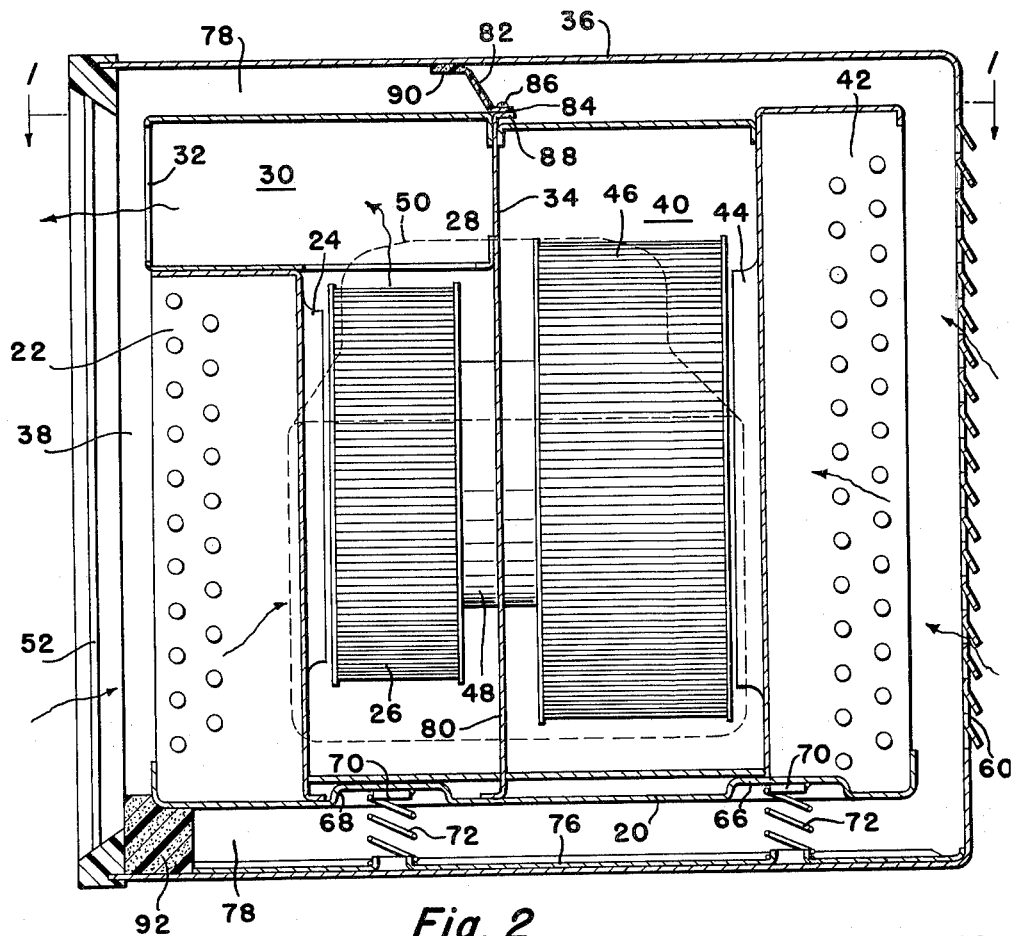
FIGURE 2 is a vertical sectional view taken substantially along the line 2—2 of FIGURE 1.

Referring now to the drawings and more particularly to FIGURES 1 and 2, there is illustrated partly diagrammatically an air conditioning unit having a sheet metal base 20 surrounded by an up-turned flange. Mounted on the sheet metal base 20 is an evaporating unit 22 of the vertical fin type provided at the rear with a shroud 24 which controls the flow of air into the blower wheel 26 which is provided with a fan scroll discharging the air through an opening 28 into the chamber 30 above the wheel 26. The chamber 30 has a discharge outlet 32 for directing the discharge from the blower 26 through the opening 32 back into the room. A dividing wall 34 extends upwardly from the base 20 and divides the interior of the enclosure 36 into a room air portion 38 and an outside air portion 40. A condenser 42 is also vertically mounted on the base 20 and has a shroud 44 which directs the flow of air after passing through the condenser 42 to the interior of the condenser blower wheel 46. The two blower wheels 26 and 46 are driven by an electric motor 48 located between them.

Also provided in the air conditioning unit is a sealed motor compressor unit 50. The room air enters through the lower portion of the grill 52 located in front of the evaporator 22 and is discharged through the opening 32 of the chamber 30 and the upper portion of the grill 52 back into the room. The fan 46 draws in air through the louvres 60 and the condenser 42 and discharges the air through the outlet louvres 56 and 58 in the side walls of the enclosure 36.

Figure 5:
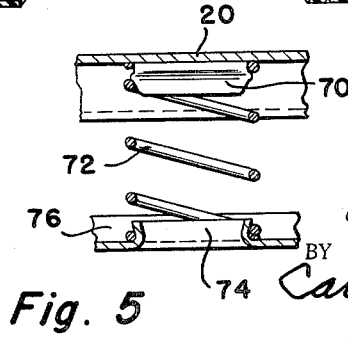
FIGURE 5 is an enlarged sectional view through one of the support springs for the air conditioning unit.

According to my invention, the base pan 20 is provided with four raised recesses, 62, 64, 66, and 68. In each of these recesses there is provided a welded button 70 which is welded to the lower face of the base 20 as is better illustrated in FIGURE 5. The welded button 70 may have straight sides slightly larger than the interior of the compression type coil spring 72 which is snapped on to each of the buttons 70. These buttons 70 have beveled edges for the purpose of facilitating the forcing of the upper end of the springs 72 thereon. The bottom of the springs 72 snap over the flanges of the openings 74 in the slide runners 76. The flanged opening 74 preferably has a slightly out turned flange so that the lower coils of the compression type coil springs 72 will snap over the slightly larger flanges of the flanged apertures 74 and be firmly held thereon. These flanges 74 are extruded from the adjacent portions of the two slide runners 76 which extend parallel to each other from the back to the front of the air conditioning unit. These runners 76 are slidably mounted on the bottom of the enclosure 36 so that by removal of the grill 52 the air conditioning unit may be slidably removed from the enclosure 36 for inspection, cleaning, or repair.

The springs 72 provide a resilient vibration absorbing mounting for the air conditioning unit which is mounted on the base 20. Adequate clearance is provided on all sides of the unit so that the unit may vibrate freely within the enclosure 36 without transmitting any vibrations or noise to the enclosure 36. The clearance space, designated by the reference character 78, is provided on all sides of the refrigerating unit composed of the members mounted on the base 20. The springs 72 are thus arranged to absorb substantially all the vibrations of the air conditioning unit to make the unit as quiet as possible.

To prevent the uncontrolled leakage of air between the inside or room air portion of the unit and the outside air portion of the unit which are otherwise separated by the dividing wall 80, I provide a synthetic elastic membrane 82 which is fastened at its one edge 84 by screws 86 through the flange 88 of the dividing wall 80. According to my invention, to prevent this membrane 82 from affecting the natural vibrations of the unit and the base 20 on the spring 72, the membrane seal 82 is made of thin flexible resilient soft polyvinylchloride having magnetic oxide powder embodied in its free edge portion 90. Preferably this powder is barium ferrite powder or bismuth manganese powder which is embedded in the slightly thickened edge portion 90 in the ratio of 40 parts of polyvinylchoride to 60 parts of the magnetic oxide powder. If desired, iron barium oxide or strontium ferrite powder may be used. This proportion is stated in terms of volume.

Figure 4:
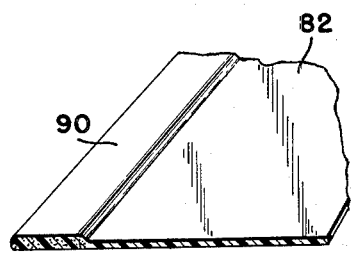
FIGURE 4 is a modified perspective view of the membrane or seal also shown in FIGURE 2.

The membrane 82 is shown in perspective in FIGURE 4 with the edge 90 thickened sufficiently to accomplish the incorporation of the magnetic oxide powder. The enclosure 36 is of common sheet steel. The edge portion 90 is magnetized alternately as north and south poles throughout its length with 80% of the magnetization being at the surface which removably contacts and extends in sealing engagement with the interior surface of the enclosure 36. The membrane 82 is of a sufficiently soft resilient and elastic polyvinylchloride and is sufficiently thin that it will deflect with the movement of the base 20 upon the springs 72 without transmitting any of the deflections or vibrations to the enclosure 36. This membrane 82 preferably extends outwardly from both sides and the top of the dividing wall 34 and has its inner edge fastened or otherwise firmly bonded by an adhesive to the dividing wall 34. The edge portion 90 is firmly attracted magnetically to the adjacent inner surfaces of the outer shell 36 so as to provide a readily disengageable magnetic form of fastening which tightly holds the edge portion 90 in contact with the interior surfaces of the shell 36. To prevent air from leaking beneath the base pan 20, there is provided a thick strip of soft sponge rubber or soft resilient foamed plastic 92 beneath the front edge of the base 20 and resting upon the front lower edge of the enclosure 36. Additional strips 91 and 93 of similar resilient foamed plastic extend beneath the sides of the base 20 from the strip 92 to the membrane 82 to prevent air leakage. These strips 91, 92, and 93 help support the weight of the unit and yet allow an adequate amount of deflection for the base 20. If desired, instead of employing the strip 92 the magnetic membrane 82 may be extended across the bottom of the base 20.

Figure 3:
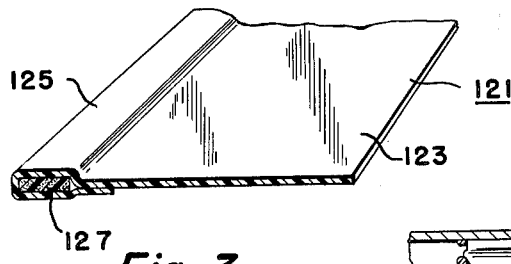
FIGURE 3 is a perspective view of a fragmentary portion of the air seal shown in FIGURES 1 and 2.

In FIGURE 3, another form of membrane 121 is illustrated in which the one edge 123 is provided for fastening to the dividing wall 34 while the opposite edge 125 has a plastic membrane looped around a flexible magnetic bar 127 which may be composed of a mixture of iron oxide powder and plastic in the proportions of 60–45 volume which is suitably magnetized in a series of alternate north and south poles so that this edge can be magnetically attracted to the enclosure 36. The looped portion of the membrane 121 may be attached by electrical or threaded stitching or heat sealing.

While I have shown the invention as specifically applied to the resilient mounting of an air conditioning unit within a sheet steel enclosure, the invention is also applicable to an air circulating unit mounted resiliently within the enclosure and provided with my magnetically edged seal bonded or otherwise fastened to the shroud of the fan. Other applications of my invention are the provision of other resiliently mounted structures within an enclosure or tube wherein it is desired to prevent movement of the air within the enclosure or tube around the resiliently mounted structure.

While the embodiments of the present invention as herein disclosed, constitutes a preferred form, it is to be understood that other forms might be adopted.

What is claimed is as follows:

1. In combination, an enclosure, a removable structure within said enclosure, slide runners in the form of long members resting upon inner wall portions of said enclosure, resilient means extending between said slide runners and said removable structure for resiliently supporting said removable structure within said enclosure, structure having a peripheral portion extending adjacent the inner surface of said enclosure, a flexible membrane extending between and forming a seal between said peripheral portion and a portion of the interior of said enclosure, said membrane having a permanently magnetized means extending into removable contact with one of said portions for making substantially sealing removable contact with said one portion, said one portion being of a paramagnetic material, said membrane having another part permanently fastened to the other of said portions.

2. In combination, an enclosure having a substantial portion in the form of top and side walls, a removable structure having a peripheral portion extending adjacent the inner surface of said top and side walls, said structure being removably mounted for movement out of said enclosure parallel to said top and side walls, a flexible membrane extending between and forming a seal between said peripheral portion and said top and side walls of said enclosure, said membrane having a permanently magnetized means extending into removable slidable contact with the inner surfaces of said top and side walls for making substantially sealing removable contact with said enclosure, said top and side walls being of a paramagnetic material, said membrane having another part permanently fastened to the peripheral portion of said removable structure.

3. In combination, an enclosure having a substantial portion in the form of top and side walls, a removable structure within said enclosure, a resilient mounting means between and providing for relative movement between said removable structure and said enclosure, said removable structure having a peripheral portion extending adjacent the inner surfaces of the top and side walls of said enclosure, a flexible membrane extending between and forming a seal between said peripheral portion and a portion of the inner surface of the top and side walls of said enclosure, said membrane having a permanently magnetized means extending into removable contact with one of said portions for making substantially sealing removable contact with said one portion, said one portion being of a paramagnetic material, said membrane having another part permanently fastened to the other of said portions and being capable of absorbing the movement of said removable structure relative to said enclosure.

4. A combination as specified in claim 3 in which the flexible membrane is permanently fastened to said peripheral portion of the removable structure, and in which the enclosure is of paramagnetic material, and in which the membrane has its permanently magnetized means extending into substantially sealing removable slidable contact with the enclosure.

References Cited by the Examiner

UNITED STATES PATENTS

| | | | |
|---|---|---|---|
| 2,859,496 | 11/58 | Nelson | 20—69 |
| 2,932,545 | 4/60 | Foley | 312—296 |
| 2,994,211 | 8/61 | Lehmkuhl et al. | 20—69 |

FRANK B. SHERRY, *Primary Examiner.*

CHANCELLOR E. HARRIS, *Examiner.*